US007617458B1

(12) United States Patent
Wassom, Jr. et al.

(10) Patent No.: US 7,617,458 B1
(45) Date of Patent: Nov. 10, 2009

(54) MANAGING NAVIGATION AND HISTORY INFORMATION

(75) Inventors: John T. Wassom, Jr., Vienna, VA (US); Jerry L. Harris, Lexington, MA (US)

(73) Assignee: AOL LLC, Dulles, VA (US)

( * ) Notice: Subject to any disclaimer, the term of this patent is extended or adjusted under 35 U.S.C. 154(b) by 1220 days.

(21) Appl. No.: 09/582,262

(22) PCT Filed: Dec. 23, 1998

(86) PCT No.: PCT/US98/27465

§ 371 (c)(1),
(2), (4) Date: Oct. 10, 2000

(87) PCT Pub. No.: WO99/34306

PCT Pub. Date: Jul. 8, 1999

(51) Int. Cl.
*G06F 3/00* (2006.01)

(52) U.S. Cl. .................. 715/760; 715/749; 715/776; 715/854; 709/219; 709/245

(58) Field of Classification Search .............. 345/749, 345/760, 776, 854; 709/219, 227, 245
See application file for complete search history.

(56) References Cited

U.S. PATENT DOCUMENTS

| | | | |
|---|---|---|---|
| 5,481,710 A | | 1/1996 | Keane et al. |
| 5,717,860 A | * | 2/1998 | Graber et al. ............... 709/227 |
| 5,946,687 A | | 8/1999 | Gehani et al. |
| 5,999,882 A | | 12/1999 | Simpson et al. |
| 6,151,631 A | | 11/2000 | Ansell et al. |
| 6,208,995 B1 | * | 3/2001 | Himmel et al. .......... 707/104.1 |
| 6,310,630 B1 | * | 10/2001 | Kulkarni et al. ............. 345/776 |
| 6,544,295 B1 | * | 4/2003 | Bodnar ....................... 709/219 |
| 2002/0026349 A1 | | 2/2002 | Reilly et al. |

OTHER PUBLICATIONS

M. Bieber et al., "Fourth generation hypermedia: some missing links for the World Wide Web", International Journal of Human-Computer Studies, Jul. 1997, Academic Press, UK, vol. 47, No. 1, pp. 31-65, XP002101194.
L. Tauscher et al., "How people revisit web pages: empirical findings and implications for the design of history systems", International Journal of Human-Computer Studies, Jul. 1997, Academic Press, UK, vol. 47, No. 1, pp. 97-137, XP002101195.
M. Bieber, "Providing information systems with full hypermedia functionality", Proceeding of the Twenty-Sixth Hawaii International Conference on System Sciences (CAT. No. 93TH0501-7), Wailea, HI, USA, Jan. 5-8, 1993, pp. 390-400, vol. 3, XP002101196.

* cited by examiner

*Primary Examiner*—Weilun Lo
*Assistant Examiner*—Mylinh Tran
(74) *Attorney, Agent, or Firm*—Fish & Richardson P.C.

(57) ABSTRACT

History and navigation information in a computer application are managed by establishing a global context that can communicate with multiple resources, each of which resides in an associated local context. State information from one or more of the local contexts is communicated to the global context, and global navigation information (for example, defining a drop-down history list or back/forward button states) is generated based on the communicated state information. Using the global navigation information, a user of the computer application can move among previously visited resources in a global manner.

50 Claims, 12 Drawing Sheets

| |
|---|
| http://www.page6.com |
| http://www.page5.com |
| http://www.page4.com |
| http://www.page3.com |
| http://www.page2.com |
| http://www.page1.com |

FIG. 3B

| |
|---|
| http://www.page3.com |
| http://www.page6.com |
| http://www.page5.com |
| http://www.page4.com |
| http://www.page2.com |
| http://www.page1.com |

| JUMP | CURRENT LOCATION | BACK BUTTON STATE | FORWARD BUTTON STATE |
|---|---|---|---|
| 0 | page1 | EMPTY | EMPTY |
| 1 | page2 | page1 | EMPTY |
| 2 | page3 | page2 > page1 | EMPTY |
| 3 | page4 | page3 > page2 > page1 | EMPTY |
| 4 | page5 | page4 > page3> page2 > page1 | EMPTY |
| 5 | page4 | page3 > page2 > page1 | page5 |
| 6 | page5 | page4 > page3> page2 > page1 | EMPTY |
| 7 | page6 | page5 > page4 > page3> page2 > page1 | EMPTY |
| 8 | page3 | page2 > page1 | page4 > page5 > page6 |
| 9 | page7 | page3 > page2 > page1 | EMPTY |

| W1 |

FIG. 6A

| W2 |
| W1 |

FIG. 6B

| A3 |
| W2 |
| W1 |

FIG. 6C

| W2 |
| A3 |
| W1 |

FIG. 6D

| A4 |
| W2 |
| A3 |
| W1 |

FIG. 6E

| W5 |
| A4 |
| W2 |
| A3 |
| W1 |

| JUMP | CURRENT LOCATION | BACK BUTTON STATE | FORWARD BUTTON STATE |
|---|---|---|---|
| 0 | W1 | EMPTY | EMPTY |
| 1 | W2 | (BROWSER1: W1) | EMPTY |
| 2 | A3 | (BROWSER1: W2 > W1) | EMPTY |
| 3 | W2 | (BROWSER1: W1) | A3 |
| 4 | A4 | (BROWSER1: W2 > W1) | EMPTY |
| 5 | W5 | A4 > (BROWSER1: W2 > W1) | EMPTY |
| 6 | W6 | (BROWSER2: W5) > A4 > (BROWSER1: W2 > W1) | EMPTY |
| 7 | A4 | (BROWSER1: W2 > W1) | (BROWSER2: W5 > W6) |
| 8 | A7 | A4 > (BROWSER1: W2 > W1) | EMPTY |

MANAGING NAVIGATION AND HISTORY INFORMATION

TECHNICAL FIELD

This invention relates to managing navigation and history information in a computer application or utility, for example, in a browser application or in an online service provider environment.

BACKGROUND

Figure 1:
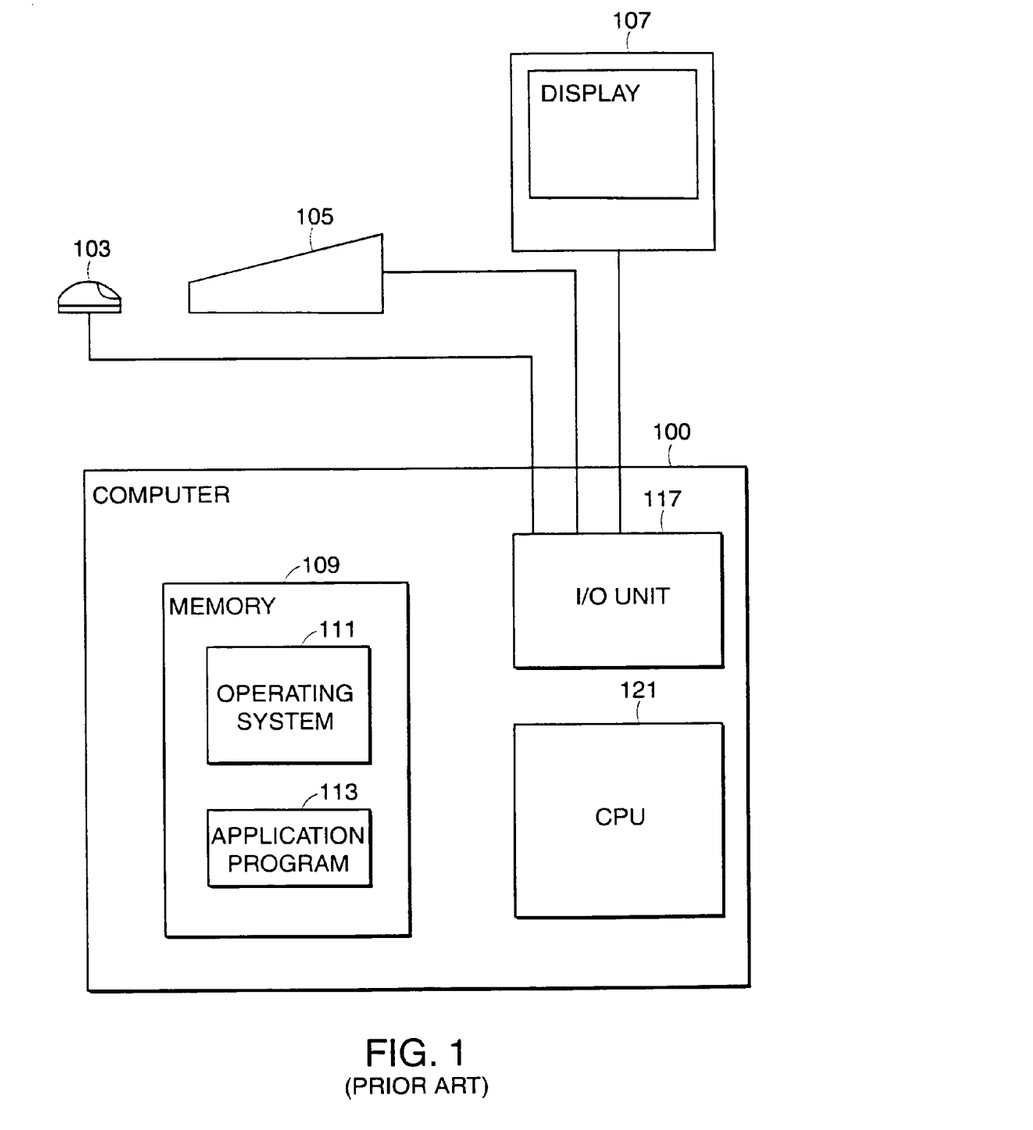
FIG. 1 is a block diagram of a computer system.

The computer system illustrated in FIG. 1 represents a typical hardware setup for executing software that allows a user to perform tasks such as communicating with other computer users, accessing various computer resources, and viewing, creating, or otherwise manipulating electronic content—that is, any combination of text, images, movies, music or other sounds, animations, 3D virtual worlds, and links to other objects. The system includes various input/output (I/O) devices (mouse 103, keyboard 105, display 107) and a general purpose computer 100 having a central processor unit (CPU) 121, an I/O unit 117 and a memory 109 that stores data and various programs such as an operating system 111, and one or more application programs 113.

Figure 2:
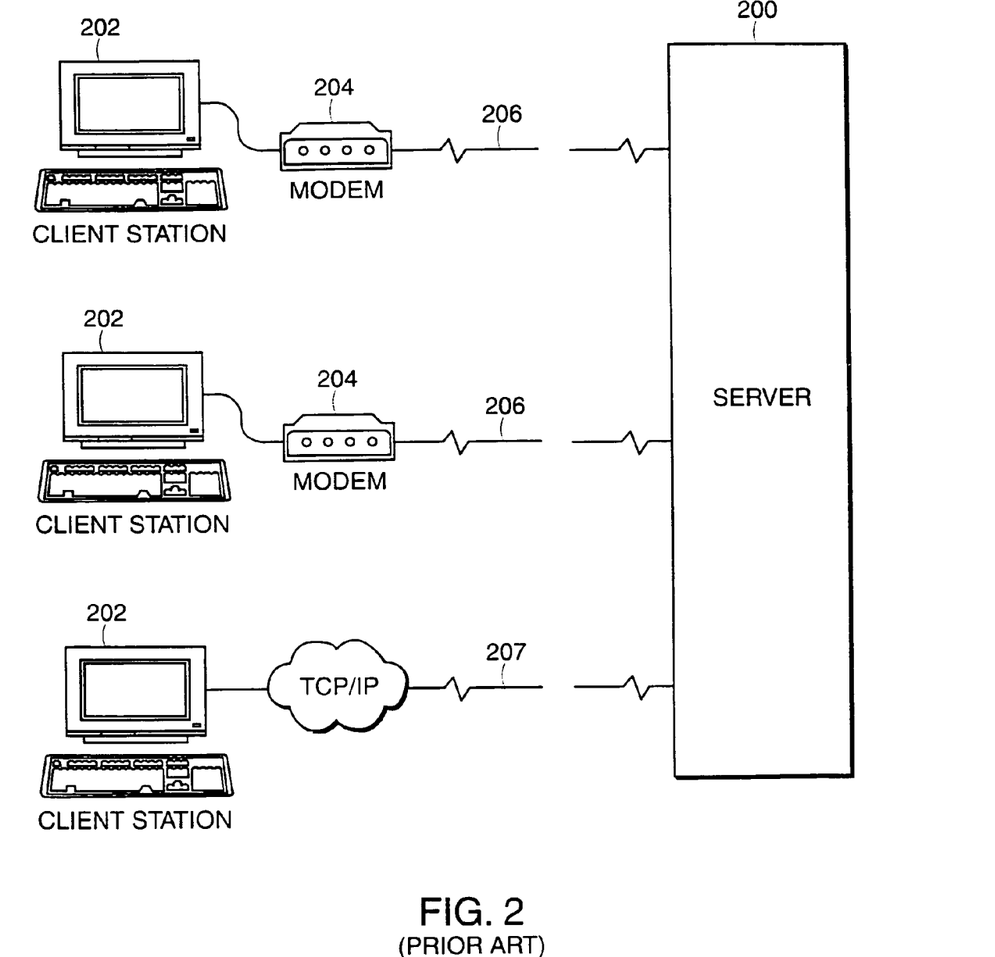
FIG. 2 shows a typical network computing environment.

As shown in FIG. 2, a user of a computer system can access electronic content or other resources either stored locally at the user's own client system 202 (e.g., a personal or laptop computer) or remotely at one or more server systems 200. An example of a server system is a host computer that provides subscribers with online computer services such as e-mail, chat rooms, Internet access, electronic newspapers and magazines, etc. Users of a host computer's online services typically communicate with one or more central server systems 200 through client software executing on their respective client systems 202. In practice, a server system 200 typically will not be a single monolithic entity but rather will be a network of interconnected server computers, possibly physically dispersed from each other, each dedicated to its own set of duties and/or to a particular geographical region. In such a case, the individual servers are interconnected by a network of communication links, in known fashion. One such server system is "America Online" from America Online, Incorporated of Virginia.

Figure 3A:
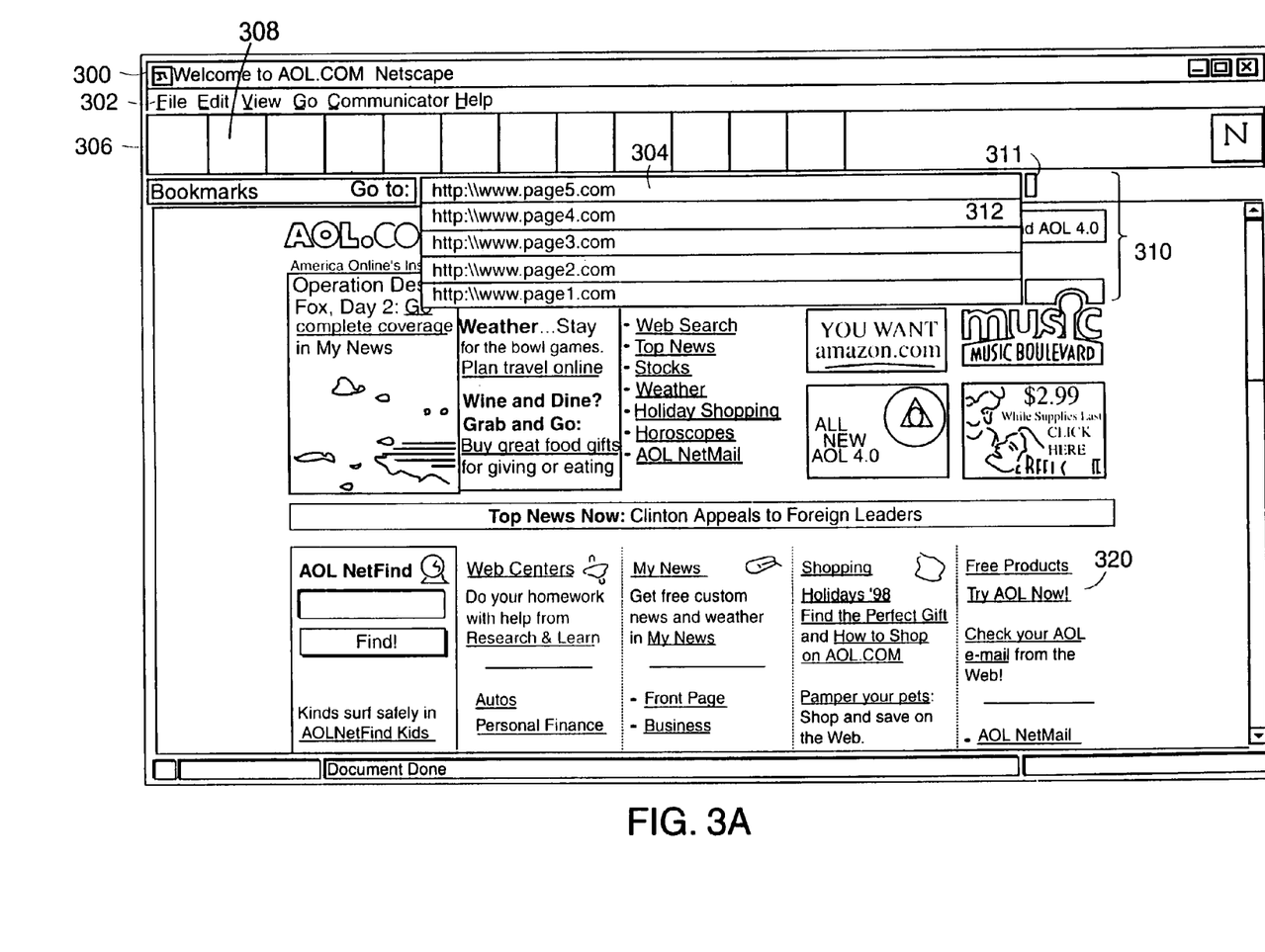
FIGS. 3A-3C show elements of a graphical user interface for an exemplary browser application.

A "browser," as depicted in FIG. 3A, is an application that enables users to access and view electronic content stored either locally or remotely, such as in a network environment (local area network (LAN), intranet, Internet). A typical browser window 300 provides a user with several options for specifying the particular content that the user desires to view. For example, the user can access a pull-down menu from a menu bar 302 to identify a particular file or address to open, or the user can manually type an address (e.g., Uniform Resource Locator (URL)) corresponding to the desired content in an Address field 304.

Several types of user applications maintain history state information identifying the programs, files or other content most recently accessed. A word-processing program, for example, may maintain a short drop-down menu showing three or four recently opened files, which a user can then easily re-open with a single click of the mouse button. A browser similarly keeps track of the history of addresses or locations accessed by the user, and uses this history information to provide the user with mechanisms for moving among the locations previously visited.

More particularly, as a user accesses content at a particular address and then moves on to a new address, and after that another new address and so on, the browser 300 keeps track of the past files or addresses that the user has visited or otherwise accessed. If the user subsequently desires to return to one of these locations, the browser may provide several different mechanisms for doing so, for example as shown in FIG. 3A, through a drop-down window 310 referred to as a "history list", and/or by using Back and Forward buttons 306 and 308, which provide stepwise access to the browser's "navigation tree"—a logical construct that defines the next location to jump to when either the Back 306 or Forward 308 buttons are clicked.

In the example shown in FIG. 3A, a user presently accessing page5 can return to the immediately previous location, page4, either by clicking the cursor once on the Back button 306 or by clicking the cursor first on the combo-box button 311, which causes the history list 310 to be displayed, and then clicking the cursor on the second topmost entry 312 in the history list 310. Subsequently, the user either can continue clicking the Back button 306 to step back through the addresses previously visited as defined by the browser's navigation tree (e.g., page3, page2, and page1 in that order) or can click on the Forward button 308 to return to the location from where the user just came, page5. In addition, the user can randomly access any of the entries in the history list 310 by clicking the cursor on the desired location. Or the user can jump to some altogether new location, for example, by typing an address in the Address field 304, by using menu functions in the menu bar 302, or by clicking on a link 320 displayed in the browser window 300.

Figure 3B:
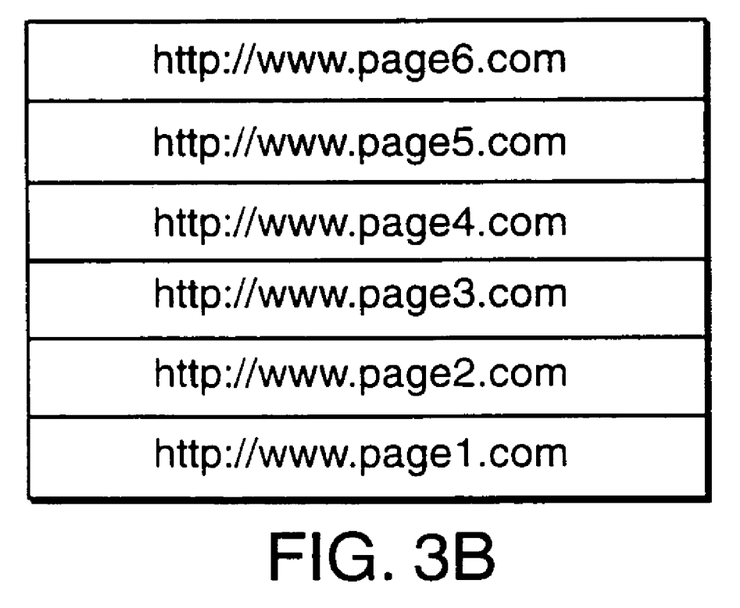

Whenever the browser jumps to another location, by whatever means, the history list 310 and the navigation tree may be updated or otherwise modified to reflect the current navigation state. For example, as shown in FIG. 3B, if a user jumps to a new location not yet visited (e.g., page6), the Address field 304 displays the new address and the history list is modified by inserting a new entry 322 immediately below the Address field 304 to list the previous location (page5). The rest of the history entries 312-318 already in the history list 310 are shifted down by one row to make room for the new entry 322. If the history list 310 becomes too lengthy, the browser may delete the oldest entries to make room for each new location visited.

Figure 3C:
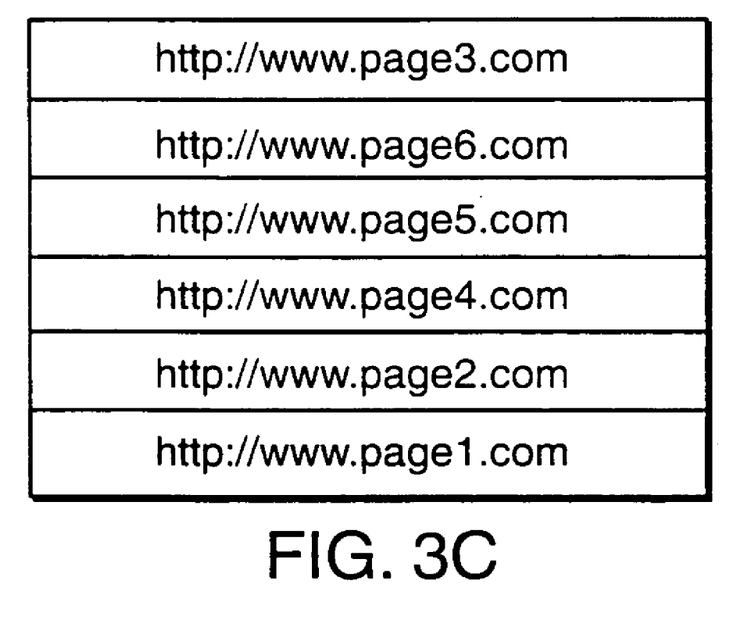

By way of another example, if the user then jumped to a previously visited location by clicking on an entry displayed in the history list 310, for example, page3, the browser would update the history list to appear as in FIG. 3C, in which the same entries appear but in a different order. Specifically, the updated history list 310 shown in FIG. 3C displays the now current address, page3, in the Address field 304, and the other previously visited locations are displayed below the Address field 304 in the order in which they were last visited (most recently visited at top, oldest at bottom). An entry for page3 no longer is displayed below the Address field 304 because the history list 310 typically will not contain duplicate entries for a location even though, as in this example, that location was visited more than once.

Figure 4A:
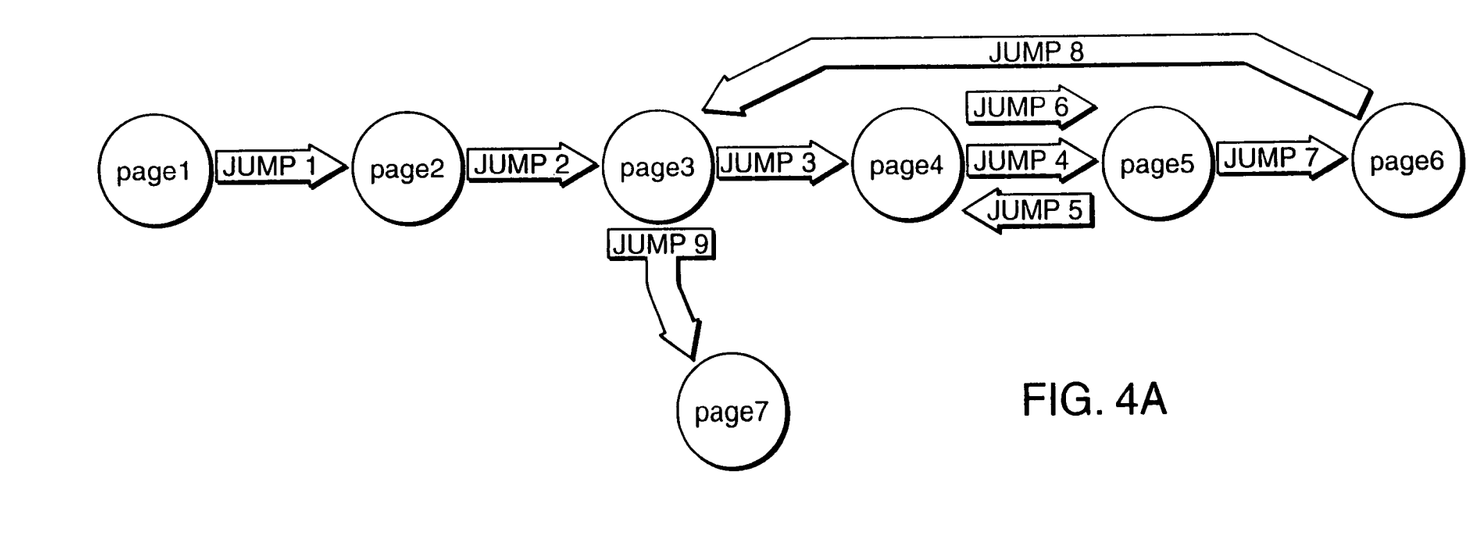
FIG. 4A is an example of a navigation tree.

For each jump to another location, whether previously visited or not, the browser also updates or modifies its navigation tree as appropriate. FIG. 4A depicts a navigation tree in which the circles represent the different locations visited and the arrows represent jumps from one location to the next. The particular navigation tree example in FIG. 4A represents an order of events in which a user makes nine jumps to visit seven different locations in the following order: page1→page2→page3→page4→page5→page4→page5→4 page6→page3→page7.

Figure 4B:
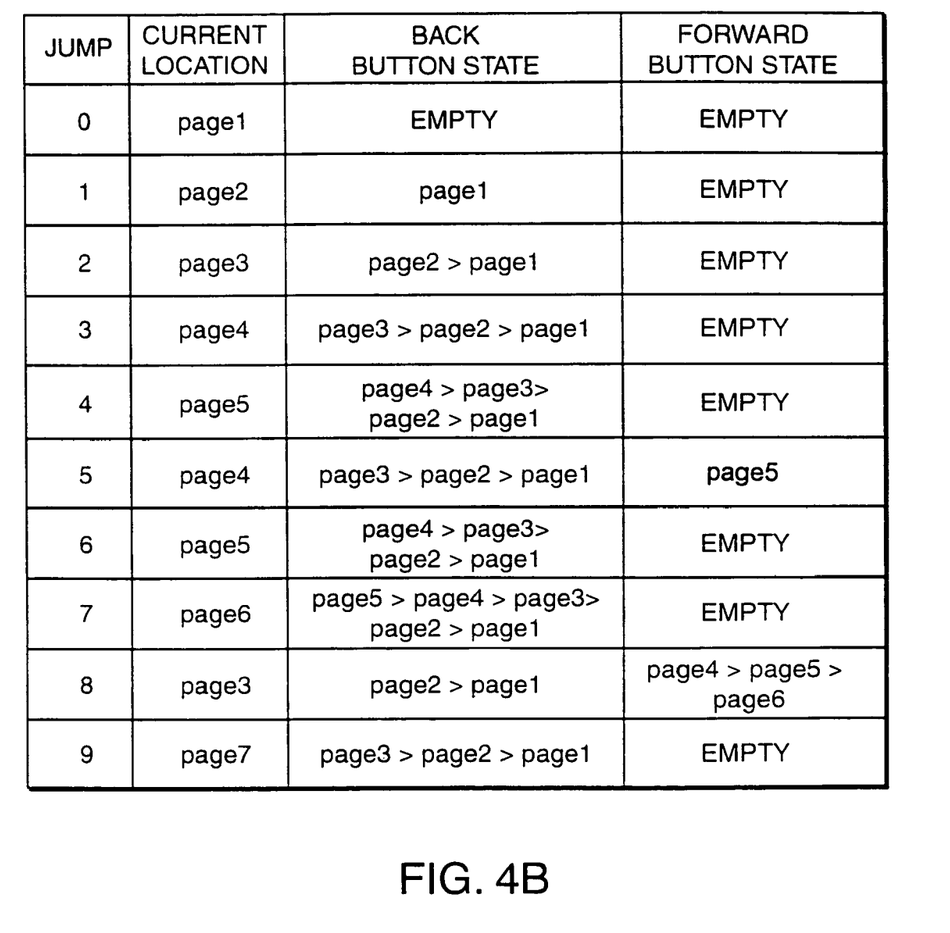
FIG. 4B is a table of Forward and Back button state information corresponding to the navigation tree of FIG. 4A.

FIG. 4B, a table corresponding to the navigation tree shown in FIG. 4A, shows state information associated with the Back and Forward buttons at each of the nine jumps. During the first four jumps (page1→page2→page3→page4→page5) the Back Button State accumulates and stores each of the successive locations for potential future use if the user clicks the Back button. After jump 4, for example, the user could click the Back button four times in succession to traverse the navigation tree in reverse order (page5→page4→page3→page2→page1).

In the first five states (jumps 0-4), because the user has not returned to any previously visited location, the Forward Button state remains empty (i.e., no Forward jump location is defined). At jump 5, however, the Forward Button state reflects that a single jump in the Forward direction (to page5) is available because the user has returned to a previously visited location (page4). At jumps 6 and 7, the Forward Button state again becomes empty as the user moves on to a new location, page6.

At jump 8, as shown in FIG. 4A, the user has traveled backward in the navigation tree from page6 directly to page3, for example, by selecting the page3 entry from the history list. At this point, as shown in FIG. 4B, the Back button state information points to page2 and then to page1 (in that order, assuming successive clicks of the Back button), while the Forward button state information points to page4, page5, and then to page6 (in that order, assuming successive clicks of the Forward button).

At jump 9, the user decides to view a new location and thus points the browser (e.g., by typing in an address in the Address field) to page 7, at which point the navigation tree is "pruned." That is, the navigation tree is modified to reflect the current state and to ensure that subsequent clicks of the Back and Forward buttons provide users with a predictable response. In the specific example of the navigation tree shown in FIG. 4A, all three of the locations within the dotted region 400—page4, page5 and page6—are removed from the navigation tree as a result of the pruning that occurs when the user moved from page3 to page7. Consequently, as shown in FIG. 4B, the Forward button state again becomes empty and the Back button state information specifies that three successive clicks of the Back button would cause the browser to move from page7 to page3, page2 and page1 in that order. Pruning of the navigation tree in this fashion typically is independent of, and does not affect, the order or identity of locations displayed in the history list—that is, all seven locations page1-page7 still would appear in the history list even though page4-page6 were pruned from the navigation tree for the Back and Forward buttons.

SUMMARY

Various implementations of the invention may include one or more of the following features.

In one aspect, history and/or navigation information in a computer application (e.g., client software for an online computer service) can be managed by establishing a global context that can communicate with multiple resources (e.g., a browser application or a non-browser application such as a word-processor or the like), each of which resides in an associated local context. State information (e.g., an Internet URL or a non-Internet address in a private network) from one or more of the local contexts is communicated, for example, in response to a change in state in one or more of the local contexts, to the global context, and global navigation information (for example, defining a drop-down history list or back/forward button states) is generated and maintained based on the communicated state information. Using the global navigation information, a user of the computer application can move among previously visited resources in a global manner. To facilitate this movement, graphical controls (e.g., Back and Forward buttons and/or a drop-down history list) can be displayed in a GUI to enable a user of an application to move among resources based on the global-context navigation information.

The change in state in a local context can include a change in a title or an address, or both, associated with a resource. The change in state in a local context can be triggered by input from a user of the computer application, for example, by one or more of clicking a cursor in a window associated with a resource, clicking on a link in a window associated with a resource, clicking on a Back/Forward navigation button, selecting an address from a displayed history list, or typing an address in an address field. Alternatively, the change in state in a local context can be triggered by a computer process transparently to a computer user, for example, when the host computer changes the title of an existing window.

The global navigation information maintained by the computer application can include state information for global-context Back/Forward buttons displayed in a graphical user interface associated with the computer application and/or state information for a global-context history list presented to a user of the computer application.

Using navigation input received from a user and the maintained the global navigation information, the computer application can change the focus (e.g., by activating a window) to move among the available resources—e.g., by changing the focus from a current window to a previously accessed window. In changing focus from a current window to a previously accessed window, the computer application may use local-context navigation information maintained by a resource (e.g., a browser application) when the user navigating within that resource's local context.

Optionally, if a previously accessed window associated has since been closed, a new instance of that window can be spawned in connection with changing the focus to that window. The user may be allowed to specify whether closing a window associated with a resource results in deletion of the window from the global navigation information. In that case, maintenance of the global navigation information may include deleting navigation information corresponding to the closed window.

Moreover, maintenance of the global navigation information may include selectively modifying the global navigation information depending on a manner in which a user interacts with the computer application. For example, modification of the global navigation information could be prevented if the user interacted with the computer application in any one or more of the following manners: clicking a cursor in a window associated with a resource, clicking on a link in a window associated with a resource, clicking on a Back/Forward navigation button, selecting an address from a displayed history list, or typing an address in an address field.

In addition, or alternatively, maintenance of the global navigation information may include pruning a navigation tree, for example, by determining that a user of the computer application is accessing a new address, and deleting forward button state information.

In another aspect, managing a history list in a computer application can be accomplished by receiving state information from multiple independent resources, each of which resides in an associated local context. Based on the received state information, the computer application maintains a history of resources accessed by a user of the computer application, and may present a global-context history list (e.g., a drop-down history list in a GUI) representative of an order in which the resources were accessed. The history of resources maintained by the computer application may correspond to a navigation path among re-sources. A user of the computer application may return to any of the listed resources by selecting a desired resource from the global-context history list. Optionally, the global-context history list presented to the user may selectively omit an identity of one or more of the accessed resources, for example, for security or privacy reasons.

State information from a local context may be communicated to the application in response to a change in state in the resource's local context (e.g., a change in an address or title, or both, associated with the resource). The state information may include an Internet URL address or a private network (i.e., non-Internet) address, or both.

Maintenance of the history of accessed resources may include selectively modifying the global-context history list depending on a manner in which a user interacts with the computer application. For example, modification of the global-context history list could be prevented if the user interacted with the computer application in any one or more of the following manners: clicking a cursor in a window associated with a resource, clicking on a link in a window associated with a resource, clicking on a Back/Forward navigation button, selecting an address from a displayed history list, or typing an address in an address field.

Moreover, maintenance of the history may include adding a new entry to a top of a list if the resource had not been accessed previously or rearranging entries in the list if the resource had been accessed previously.

The techniques, methods and systems described here may provide one or more of the following advantages. For example, they may permit a computer application, such as a browser or an online service, to provide users with a global context for history and navigation information. As a result, a user can operate a single set of navigation controls (e.g., Back/Forward buttons, drop-down history list) to navigate among separate and independent resources (application, windows, etc.) that have no knowledge of each other's state or existence. In addition, by implementing specific rules for updating or otherwise modifying the global history state information, users are provided with a robust navigation environment for moving quickly and easily among previously visited windows.

The details of one or more embodiments are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 5:
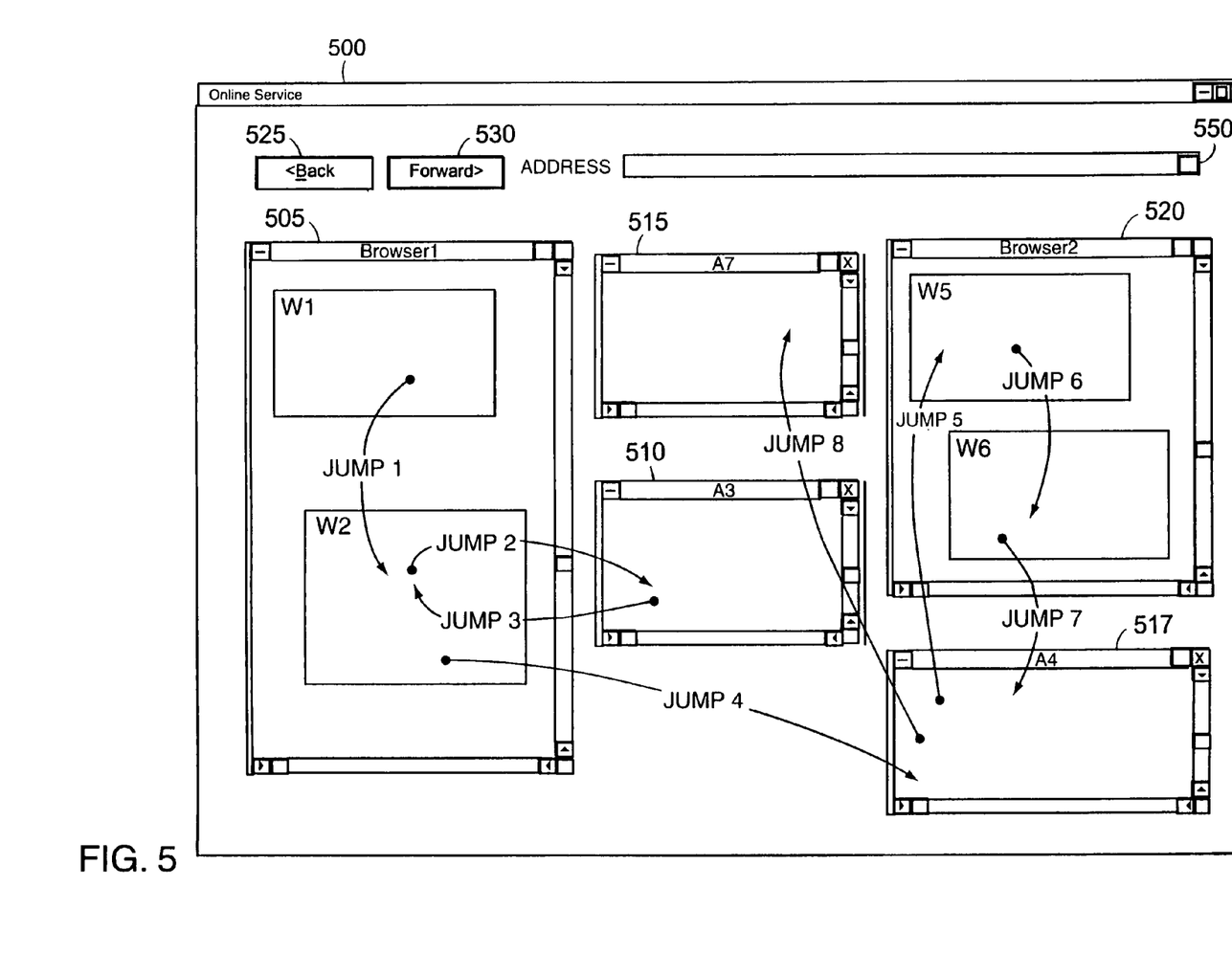
FIG. 5 shows an example of a graphical user interface for an online service.

FIG. 5 shows a graphical user interface (GUI) 500 for an online computer service in which a user (i.e., a subscriber of the online service) has several different windows (or "forms") open simultaneously. Each window typically associated with a different resource—for example, a browser or other application, a system utility, a file of electronic content, etc.—or, optionally, a single resource can have a main window with one or more associated sub-windows. For example, as shown in FIG. 5, Browser1 is a single resource having open a window 505 and two sub-windows W1 and W2, perhaps corresponding to web-pages at two different URLs. But typically each resource will be associated with a single window—e.g., window A7—with no sub-windows. In the example shown, windows having a "W" prefix correspond to Internet content located at an associated URL and typically viewed with a browser, while windows having an "A" prefix correspond to non-public resources, for example, residing in a private network or on a client computer. As used herein, the terms "address" and "location" are interchangeable and apply to both types of windows.

In conventional systems, each resource (e.g., Browser1) may maintain its own local set of history and navigation information independently of the other resources. In such a system, Browser1 could have its own navigation mechanisms (e.g., Back/Forward buttons and/or a drop-down history list) to move between windows W1 and W2. However, a browser in a conventional system is unaware of the existence of, and unable to coordinate with, other windows and/or resources that are open and being used concurrently. As a result, Browser1's navigation mechanisms could not be used to move from window W1 or W2, for example, to window A3. In other words, Browser1's history and navigation information is limited to its own local context.

In contrast, the client application 500 shown in FIG. 5 maintains navigation and history information in a global context—that is, with knowledge of, and the potential ability to coordinate and move between all of the resources accessed by the user. As a result, the client application 500 is able to provide a user with a robust history and navigation management environment for moving among potentially disparate and independent resources.

In the course of doing work, a user may desire to move between several different windows in an arbitrary manner. For example, a user working on a research project may open a window A3 for viewing an online periodical on the service provider's private network, two different sub-windows W1 and W2 within the Browser1 to do research on the Internet, and an e-mail window A7 to type up notes. The user can move among the various open windows, and thereby facilitate use of the corresponding resource, by clicking the mouse cursor in the window of interest—an operation referred to as making the window "active" or in "focus."

In the example shown in FIG. 5, the user has open three service provider-based windows, A3, A4 and A7, and two separate browser instances, Browser1 and Browser2. Any suitable browser may be used, for example, Microsoft Internet Explorer or Netscape Navigator, and can be implemented either as a standalone application or in modified form as an embedded browser. In the example shown in FIG. 5 and described below, the client application uses an embedded Microsoft Internet Explorer browser that has been modified to appear as a standard window without the toolbars and other GUI features present on the standalone version. The client application communicates with the browser through a standard API (application programming interface). The client application communicates with the host computer—for example, in order to create, delete or manage windows—using messages generated by a scripting language.

As indicated by the arrows in FIG. 5, the user in this example makes eight jumps among seven different locations (W1, W2, A3, A4, W5, W6, A7) within five separate resources 505, 510, 515, 517 and 520. The client application 500 keeps track of these jumps as they are made and uses the information as appropriate to modify both a global history list 550 and the navigation state information for global Back and Forward buttons 525, 530. The user can manipulate these global history and navigation mechanisms as desired to quickly and easily step between locations previously visited, without regard to which location corresponds to which resource.

Figure 6A:
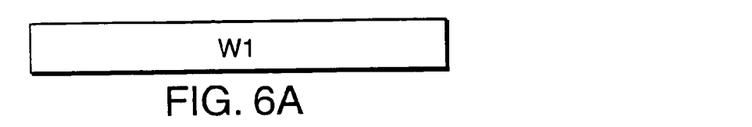
FIGS. 6A-6I show successive states of a history list as a user jumps to different locations.
Figure 6B:
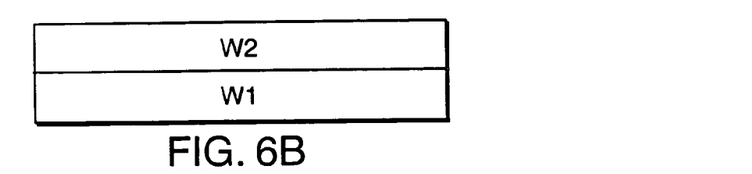
Figure 6C:
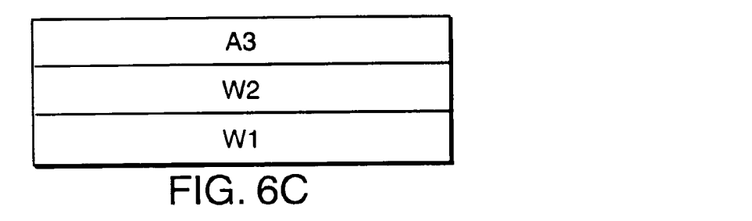
Figure 6D:
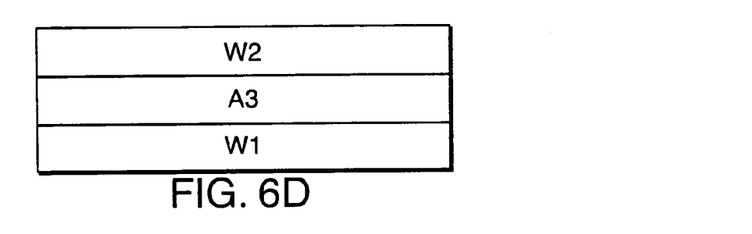
Figure 6E:
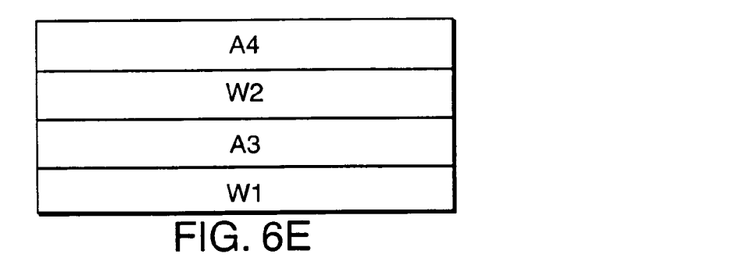
Figure 6F:
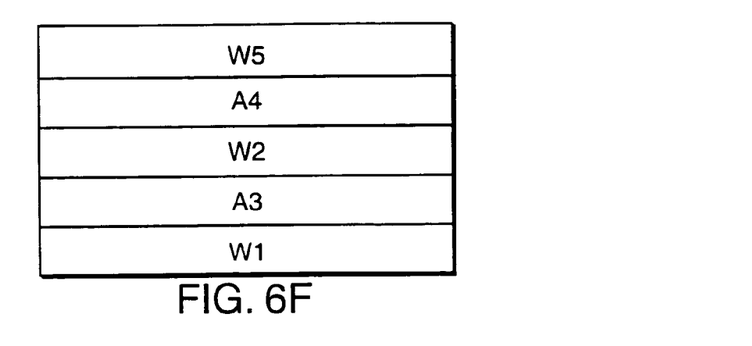
Figure 6G:
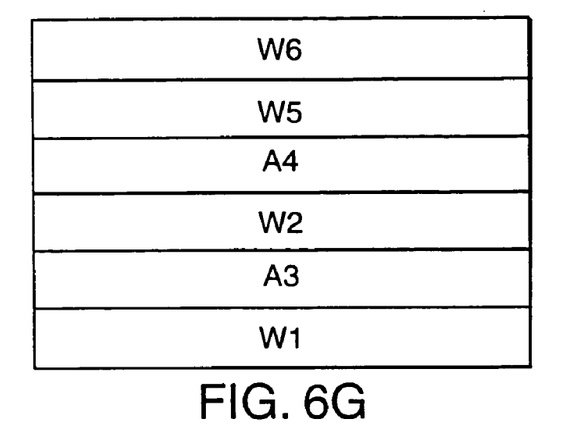
Figure 6H:
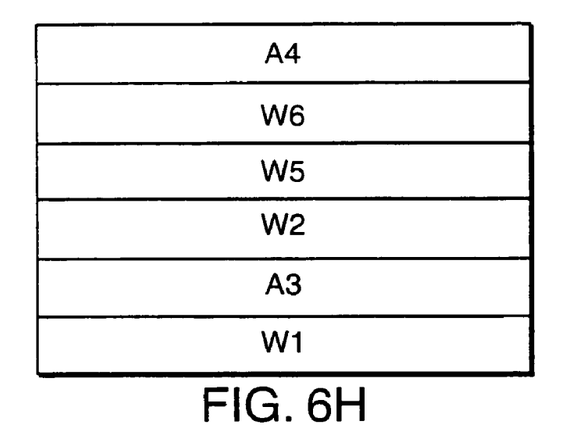
Figure 6I:
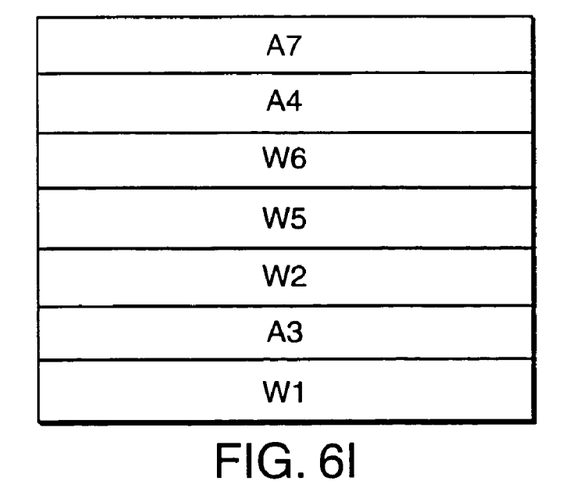
Figure 7:
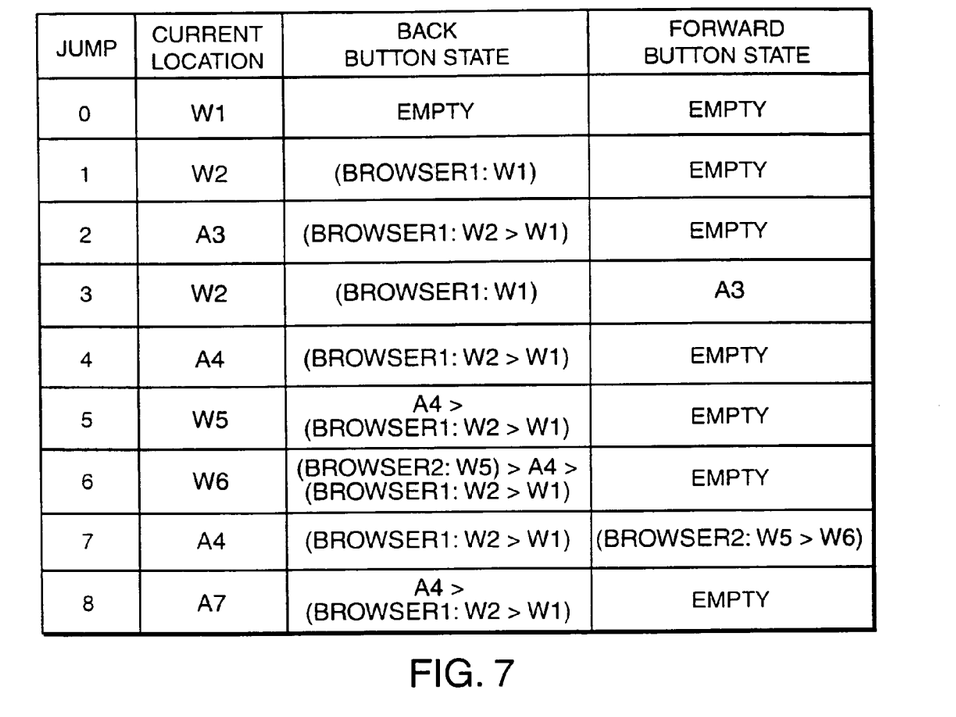
FIG. 7 is a table of Forward and Back button state information corresponding to the history list states shown in FIGS. 6A-6I.

FIGS. 6A-6I depict successive states of the global history list 550, and FIG. 7 shows navigation state information for the global Back and Forward buttons 525, 530, as the user makes the eight jumps among the various locations.

FIG. 6A shows the state of the history list while the user is visiting location W1 in FIG. 5. At this point, the history list contains only a single entry corresponding to W1. Because the user is navigating within the context of a browser, the client's global Back and Forward button states point to Browser1, as shown in FIG. 7, meaning that for any Back or Forward button clicks received, the client should instruct Browser1 to access its own local history and navigation information in making jumps backward or forward, depending on which button was clicked. At Jump 0, however, Browser 1 has not yet made any jumps and thus its local history information is empty. Consequently, because the client also has not yet accumulated any global back/forward state information, the client's Back and Forward states also are empty as shown in FIG. 7.

The user then jumps to a new address W2, for example, by clicking on a link displayed in W1, while remaining in the context of Browser1. Typically, this action would cause window W1 to update its contents and address to point to the URL designated by the link, in which case there would be no need for window W2. But in the example shown, when the user clicks on the link, Browser1 is configured to spawn a new sub-window, W2, corresponding to the new URL. In either case, the history list is updated in response to the jump by adding a new entry at the top corresponding to W2. As shown in FIG. 7, the client's Back/Forward button state information indirectly points to and uses Browser1's back and forward state information because the user still is navigating within the local context of Browser1.

As shown in FIG. 6C, a subsequent jump to A3 causes the history list to add another new entry corresponding to location A3—notably, a location outside the context of Browser1 . In addition, as shown in FIG. 7, the client's Back button state information points to Browser1, thereby indicating that the client should return to Browser1 and use its local history information (W2→W1) if the user clicks the back button while at location A3.

At this point, the user could access the drop-down history list to return to any previously visited location in the history list. Alternatively, the user could press the Back button to return either to location W2 (a single click of the Back button) or to W1 (two clicks of the Back button). If the client application did not keep track of global history and navigation information, the user would be unable to use the navigation controls to move between different resources in this manner. This is because window A3 is unaware of the existence of Browser1 and its two windows, W1 and W2, and thus does not have sufficient context to make a Backward jump from A3 to W2.

A subsequent jump from A3 back to W2 causes a rearrangement in the history list, as shown in FIG. 6D, to reflect that W2 is the most recently visited location and locations A3 and W1 both were visited previously. Even though W2 also was visited between locations A3 and W1, the history list does not reveal that fact because the history list by design does not include duplicate entries. At the same time, Browser1 modifies its local history information to list only a single jump back to W1, while the client's global button state information is modified to add a new entry (A3) to the Forward button state.

Next, upon jumping to A4, a new entry for that location is added to the top of the history list as shown in FIG. 6E and the navigation tree is pruned, as indicated in FIG. 7, to remove A3 from the Back/Forward buttons' navigation path. Pruning typically has no affect on the history list or on the windows displayed to the user. Rather, pruning affects the state information for the Back/Forward buttons and thus modifies the navigation path that a user will take at any given time upon pressing the Back/Forward buttons. The client application could be designed, however, such that pruning of the navigation tree also affects the history list or the display of windows, or both.

Subsequent jumps to locations W5 and W6 in Browser2, cause corresponding changes in the history list, as shown in FIGS. 6F-6G, and in the Back/Forward state information, as shown in FIG. 7.

Departing momentarily from the example of FIG. 5, assume that following jump 6 (while the user is at W6), the user desires to use the Back button to jump backwards two hops to A4. Jumps (forward or backward) within the same browser context are effected by having the client application instruct the browser, via the API, to move forward or backward one jump at a time. However, due to its local context for history and navigation information, Browser2 in this example has no knowledge of location A4 and thus can facilitate only a single hop backward to W5. Accordingly, using the API, the client application first instructs Browser2 to make a jump backwards to W5. Thereafter, the client application takes over and, using its global history and navigation information, causes A4 to become the focus.

In other words, once the user is within the local history context of a browser window and clicks the Back/Forward buttons, the user will traverse to the beginning or end of that browser's local history list until it is exhausted. As a result, the client application does not have to keep track of each address (e.g., URL) visited by the browser. Rather, because the client application effectively uses the browser's local history list while the user in navigating within the browser's local history context, the client application needs only to keep track of the locations visited by the user on either side of the browser—i.e., the identity of the locations to jump to when the browser's local back/forward navigation information is exhausted.

Returning to the example of FIG. 5, subsequent jumps back again to A4 and finally to A7, cause corresponding changes to the history list, as shown in FIGS. 6H-6I, and a similar pruning of locations W5 and W6, as shown in FIG. 7.

FIGS. 6A-6I depict the situation in which the user moves between locations in a manner that triggers the history list to change. Depending on the desired implementation, however, the history list could be selectively modified depending on the manner in which a user jumps from one location to another. For example, the client application could be designed so that if the user moves among open windows simply by changing the focus (i.e., clicking the cursor in a desired window), then the history list is not rearranged or otherwise modified. Alternatively, or in addition, the client application could be designed to modify the history list in response to clicks on the Back/Forward buttons, clicks on links displayed within a window, and/or the entry of an address in the Address field.

In a similar vein, updating of the history list could be constrained for certain specified windows or locations such that the location's address or other identifying information is not displayed in the history list. This might be the case where the window's identifying information is sensitive for some reason, or where the client does not want users to be able to access the address independently of the client application.

The state information for the Back and Forward buttons generally will be affected whenever the user jumps to another location, regardless of the manner in which the jump is made, in order to provide users with predictable behavior for the Back/Forward buttons. However, this behavior too can be changed by the system designer as desired to delimit or otherwise specify the circumstances under which the Back/Forward button state information is modified.

Another design parameter that can be changed by a system designer is the behavior exhibited when a user attempts to use the Back/Forward buttons to move to a previously visited window that has since been closed. In one implementation, the client application can allow such a back/forward jump by spawning another instance of the closed window and making that window the focus. Alternatively, the client application could effectively prevent such Back/Forward button-induced jumps by purging all traces of a window from the navigation and history information when the window is closed. The client application could allow users to switch back and forth between these two different behaviors by providing an appropriate preference option, for example, a GUI check box that enables or disables the feature "Use Back/Forward buttons to track open windows only."

Figure 8A:
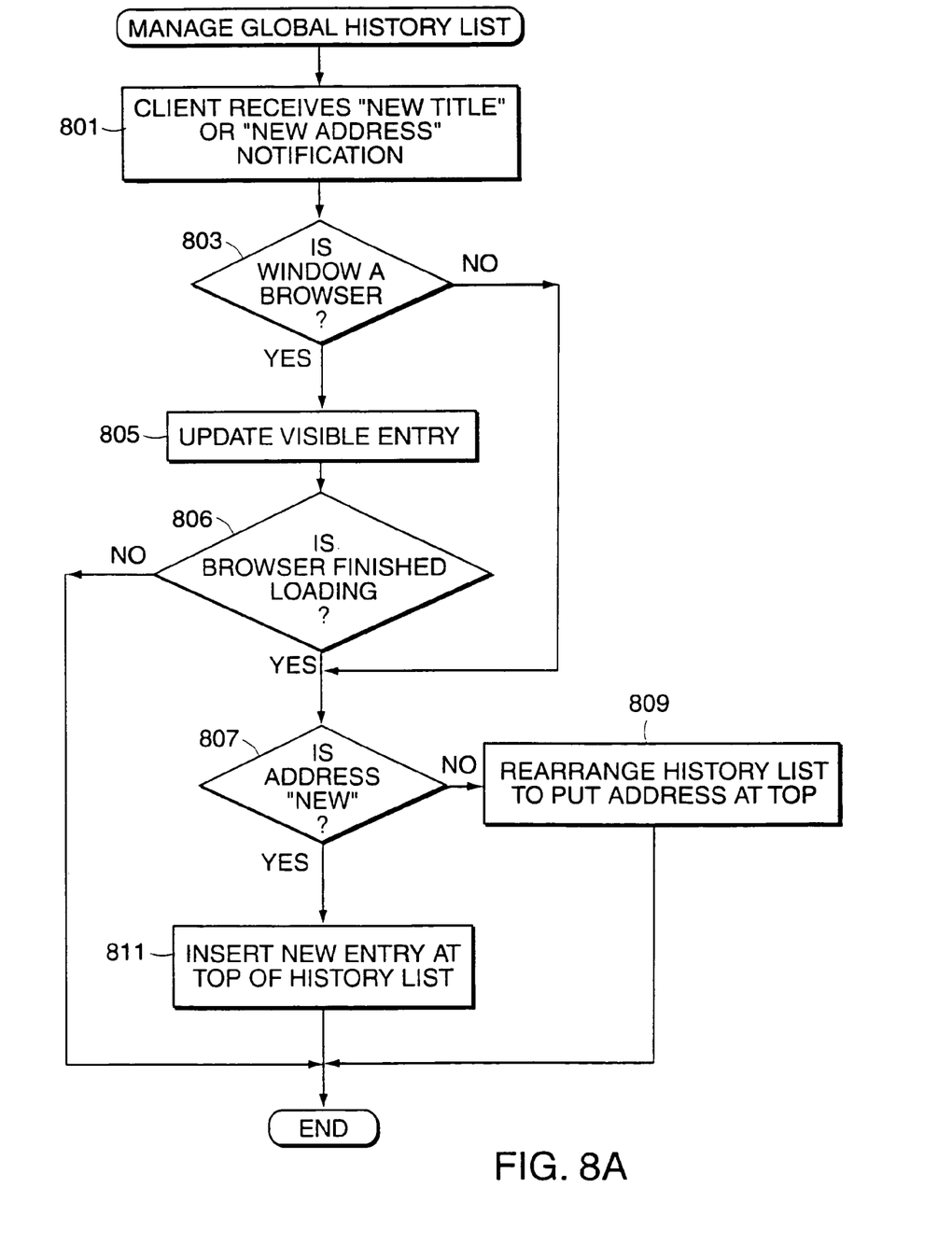
FIGS. 8A and 8B are flowcharts of processes for managing global history and navigation information.

FIG. 8A is a flowchart showing a process by which the client application manages the global history list based on incoming information about changes to or additions of window titles or associated addresses, which may occur independently of one another. For example, occasionally the title of a non-browser window (e.g., a window associated with the online service's private content) will be changed while maintaining the same address. In that case, the corresponding history list entry should be modified to update (swap) the new title for the old title, and without creating a new history list entry.

On the other hand, changes to window titles and addresses often occur in conjunction with each other (for example, when a user clicks on a link to a URL) in which case the history list should be modified to add a new entry if the address was not visited previously, or rearranged if the address was visited previously.

Accordingly, the process of FIG. 8A begins whenever the user triggers a jump to a location different (whether new or previously visited) than the present location or whenever the title or address of an existing window (whether active or not) is to be changed (for example, automatically by the host computer). In response to either of these events, the client receives a message either that the title or the address of a particular window is being changed (step 801).

The client then determines whether or not the window under consideration is a browser (step 803). If the window is not a browser, the flow jumps to step 807, discussed below. If the window is a browser, the client updates the visible entry appearing in the Address field (step 805). This visible address may differ from the "actual URL" that corresponds to the true address of the location being accessed. In some cases, an address entered by the user might not be the true or complete address, but rather may serve merely as a proxy or abbreviation that points to the actual address.

The client next determines whether or not the browser has finished loading the content from its associated URL, or whether the browser is in a transient state (i.e., still loading content from a designated URL) (step 806). If the browser has not finished loading, the process ends for the time being. When the browser subsequently finishes loading, it signals a new event and the process begins again at step 801.

If, on the other hand, the browser has finished loading, the client next determines whether the address/title in question is new (step 807). If so, the client adds the address as a new entry at the top of the history list (step 811). If the list has reached its maximum size, the entry at the bottom of the list is removed as the new entry is added to the top. If the address/title is not new, the number of entries in the history list is kept the same and the list is rearranged to move the address/title from its prior slot up to the top of the list (step 809).

Figure 8B:
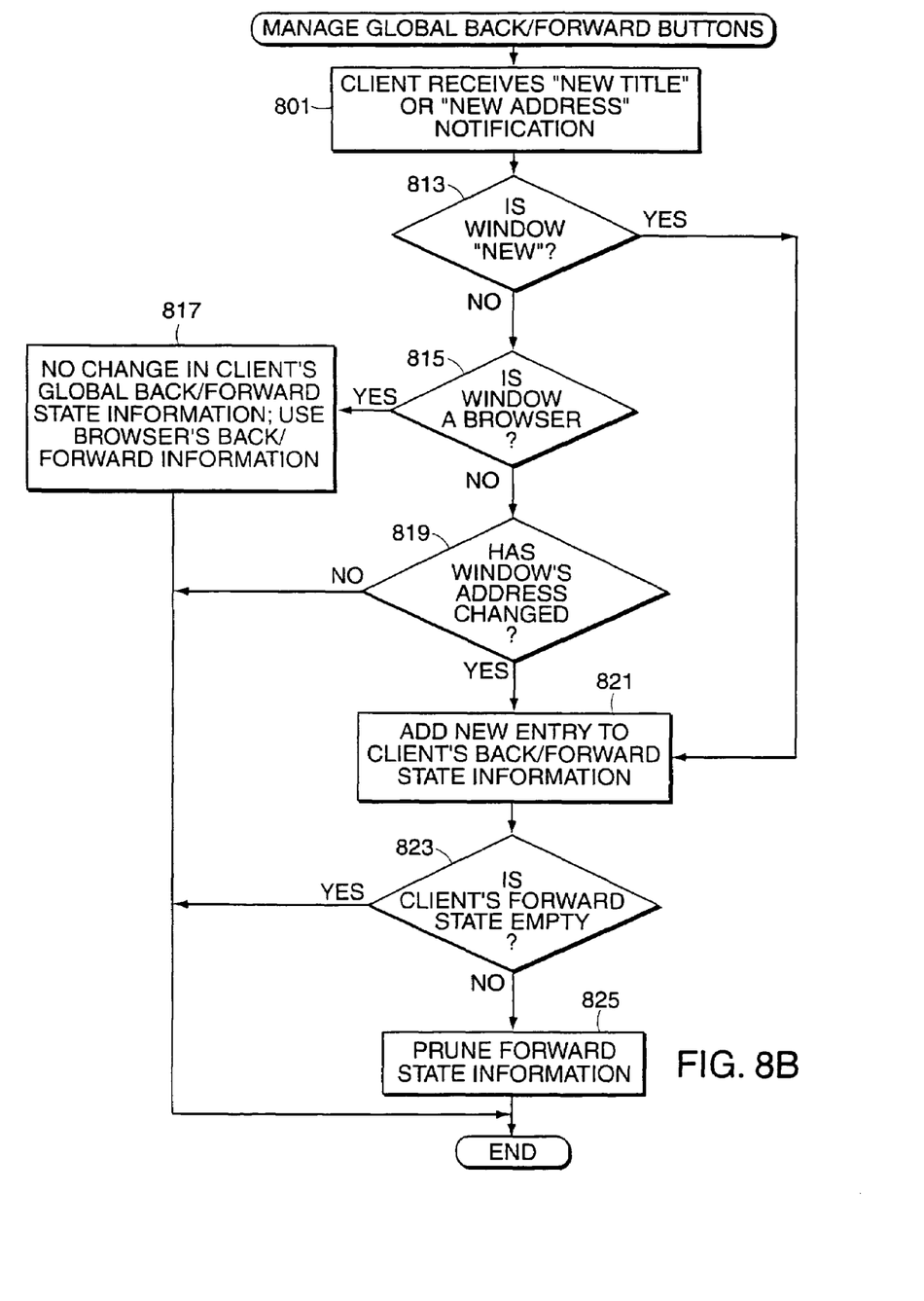

FIG. 8B is a flowchart showing a process by which the client application manages the global Back/Forward button state information based on incoming information about changes to, or additions of, window titles or associated addresses. Step 801 in FIG. 8B is the same as in FIG. 8A.

At step 813, the client determines whether or not the window under consideration was newly generated. If so, the client uses the window's GID (a globally unique identifier) to add a new entry to the client's global Back/Forward state information (step 821).

If the window is not new, the client determines whether or not the window is a browser (step 815). If so, the client continues to use the browser's local back/forward state information (step 817) and the process ends without altering the client's global Back/Forward button state information.

If the window is not a browser, the client determines whether the window's address has changed from what it was previously (step 819). If the address has changed, the client uses the window's new address to add a new entry to the client's global Back/Forward state information (step 821). If the address has not changed, the process ends without altering the client's global Back/Forward button state information.

Next, the client determines whether the client's global Forward state is empty (step 823). If so, no pruning is required and the process ends. However, if the client's global Forward state is not empty, then the client prunes the currently saved Forward button state information, and the process ends thereafter.

The techniques, methods and systems described here may find applicability in any computing or processing environment in which electronic content may be viewed, accessed or otherwise manipulated. For example, the global navigation tree and history maintenance techniques could be used by virtually any user application (e.g., word-processor, drawing program, etc.) in which the user opens multiple files in multiple windows and desires to move among them in an arbitrary manner. Similarly, an operating system could maintain a global context to track the use of various system resources (applications, utilities, etc.), and then use that information to provide users with a quick and easy mechanism for jumping back to, and among, previously used resources.

Various implementations of these systems and techniques may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including semiconductor memory devices, such as EPROM, EEPROM, and flash memory devices; magnetic disks such as internal hard disks and removable disks; magneto-optical disks; and CD-ROM disks.

Any of the foregoing may be supplemented by, or implemented in, specially-designed ASICs (application-specific integrated circuits).

A number of embodiments of the present invention have been described. Nevertheless, it will be understood that various modifications may be made without departing from the spirit and scope of the invention. Accordingly, other embodiments are within the scope of the following claims.

What is claimed is:

1. A method of managing navigation information in a computer application, the method comprising:
    establishing, at a client system that includes a processor, a global context that can communicate with a plurality of resources, each resource residing in an associated local context;
    communicating, on the client system, state information from one or more local contexts to the global context;
    maintaining, at the client system, global navigation information for the plurality of resources using a single navigation interface based on the communicated state information, wherein the plurality of resources are separate and independent resources that include both browser and non-browser applications; and
    presenting, at the client system, the global navigation information as an ordered list of the resources representative of an order in which the resources were accessed using the single navigation interface.

2. The method of claim 1 in which the communication of state information occurs in response to a change in state in one or more of the local contexts.

3. The method of claim 2 in which the change in state in a local context comprises a change in a title associated with a resource or a change in an address associated with the resource, or both.

4. The method of claim 2 in which the change in state in a local context is triggered by input from a user of the computer application.

5. The method of claim 4 in which the user's triggering input comprises one or more of clicking a cursor in a window associated with a resource, clicking on a link in a window associated with a resource, clicking on a Back/Forward navigation button, selecting an address from a displayed history list, or typing an address in an address field.

6. The method of claim 2 in which the change in state in a local context is triggered by a computer process transparently to a computer user.

7. The method of claim 6 in which the transparent triggering comprises a title change notification from a host computer.

8. The method of claim 1 in which the global navigation information comprises state information for global-context Back/Forward buttons displayed in a graphical user interface associated with the computer application.

9. The method of claim 1 in which the global navigation information comprises state information for a global-context history list presented to a user of the computer application.

10. The method of claim 1 further comprising:
    receiving navigation input from a user of the computer application; and
    changing a focus to move among the resources based the received navigation input and the global navigation information.

11. The method of claim 10 in which changing the focus comprises activating a window associated with a resource.

12. The method of claim 1 in which maintenance of the global navigation information comprises selectively modifying the global navigation information depending on a manner in which a user interacts with the computer application.

13. The method of claim 12 in which the global navigation information is not modified if the manner in which the user interacts with the computer application comprises one or more of clicking a cursor in a window associated with a resource, clicking on a link in a window associated with a resource, clicking on a Back/Forward navigation button, selecting an address from a displayed history list, or typing an address in an address field.

14. The method of claim 1 in which maintenance of the global navigation information comprises pruning a navigation tree.

15. The method of claim 14 in which pruning the navigation tree comprises:
    determining that a user of the computer application is accessing a new address; and
    deleting forward button state information.

16. The method of claim 1 further comprising changing focus from a current window to a previously accessed window based on the global navigation information.

17. The method of claim 16 in which, if a window associated with the previously accessed address has been closed, spawning a new instance of that window.

18. The method of claim 16 in which changing focus from a current window to a previously accessed window comprises using local-context navigation information maintained by a resource when navigating within that resource's local context.

19. The method of claim 18 in which the resource maintaining local-context navigation information comprises a browser application.

20. The method of claim 1 in which a user can specify whether closing a window associated with a resource results in deletion of the window from the global navigation information.

21. The method of claim 1 in which maintenance of the global navigation information comprises deleting navigation information corresponding to a closed window.

22. The method of claim 1 in which one or more of the resources comprises a browser application.

23. The method of claim 1 in which one or more of the resources comprises a non-browser application.

24. The method of claim 1 in which the computer application comprises online service client software.

25. The method of claim 1 in which the global navigation information comprises a navigation path to move among resources.

26. The method of claim 1 in which the communicated state information comprises a Uniform Resource Locator address.

27. The method of claim 1 in which the communicated state information comprises a non-internet network address.

28. The method of claim 1 wherein browser applications include web browser applications and non-browser applications include word processing applications.

29. A method of managing a history list in a computer application, the method comprising:
   receiving, at a client system that includes a processor, state information from a plurality of independent and separate resources that include both browser and non-browser applications, each resource residing in an associated local context;
   based on the-received state information, maintaining, at the client system, a history of resources accessed by a user of the computer application; and
   presenting, at the client system, a global-context history list representative of an order in which the resources were accessed using a single navigation interface.

30. The method of claim 29 further comprising enabling a user of the computer application to return to any, of the listed resources by selecting a desired resource from the global-context history list.

31. The method of claim 29 in which a resource communicates state information in response to a change in state in the resource's local context.

32. The method of claim 31 in which the change in state in the resource's local context comprises a change in an address associated with that resource.

33. The method of claim 31 in which the change in state in the resource's local context comprises a change in a title associated with that resource.

34. The method of claim 29 in which the global-context history list presented to the user selectively omits an identity of one or more of the accessed resources.

35. The method of claim 29 in which maintenance of the history of accessed resources comprises selectively modifying the global-context history list depending on a manner in which a user interacts with the computer application.

36. The method of claim 35 in which the global-context history list is not modified if the manner in which the user interacts with the computer application comprises one or more of clicking a cursor in a window associated with a resource, clicking on a link in a window associated with a resource, clicking on a Back/Forward navigation button, selecting an address from a displayed history list, or typing an address in an address field.

37. The method of claim 29 in which presentation of the global-context history list comprises displaying a drop-down history list to a user.

38. The method of claim 29 in which maintenance of the history comprises adding a new entry to a top of a list if the resource had not been accessed previously.

39. The method of claim 29 in which maintenance of the history comprises rearranging entries in a list if the resource had been accessed previously.

40. The method of claim 29 in which the history of resources corresponds to a navigation path among resources.

41. The method of claim 29 in which the state information received from a resource comprises a Uniform Resource Locator address.

42. The method of claim 29 in which the state information received from a resource comprises a non-internet network address.

43. The method of claim 29 wherein browser applications include web browser applications and non-browser applications include word processing applications.

44. A computer-readable storage medium storing instructions that, when executed, cause a processor to generate a software application environment for a computer system, the environment comprising:
   a plurality of resources each having an associated local context, wherein the plurality of resources are separate and independent resources that include both browser and non-browser applications;
   an application capable of communicating with each of the plurality of resources, the application maintaining a global-context navigation information based on state information received from one or more of the resources; and
   a navigation mechanism that includes a single navigation interface and enables a user of the application to move among the resources based on the global-context navigation information, wherein the global-context navigation information is presented as an ordered list of the resources representative of an order in which the resources were accessed using the single navigation interface.

45. The medium of claim 44, wherein the environment further comprises graphical controls that enable a user of an application to move among resources based on the global-context navigation information.

46. The medium of claim 44 wherein browser applications include web browser applications and non-browser applications include word processing applications.

47. A computer-readable storage medium storing instructions for causing a computer system to perform the following operation:
   establish a global context that can communicate with a plurality of resources, each resource residing in an associated local context, wherein the plurality of resources are separate and independent resources that include both browser and non-browser applications;
   communicate state information from one or more of the local contexts to the global context;
   maintain global navigation or history information, or both, based on the communicated state information using a single navigation interface; and
   present the global navigation information or the history information as an ordered list of the resources representative of an order in which the resources were accessed using the single navigation interface.

48. The medium of claim 47 further comprising instructions to enable a user of an application to move among resources based on the global navigation or history information.

49. The medium of claim 48 further comprising instructions to display graphical controls with which the user interacts to move among resources.

50. The medium of claim 47 wherein browser applications include web browser applications and non-browser applications include word processing applications.

* * * * *